US011316226B2

(12) United States Patent
Miyoshi et al.

(10) Patent No.: US 11,316,226 B2
(45) Date of Patent: Apr. 26, 2022

(54) BATTERY MODULE

(71) Applicant: HONDA MOTOR CO., LTD., Tokyo (JP)

(72) Inventors: Kyosuke Miyoshi, Saitama (JP); Masao Kawata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 16/773,067

(22) Filed: Jan. 27, 2020

(65) Prior Publication Data

US 2020/0259138 A1 Aug. 13, 2020

(30) Foreign Application Priority Data

Feb. 12, 2019 (JP) .............................. JP2019-022686

(51) Int. Cl.
*H01M 50/20* (2021.01)
*H01M 10/04* (2006.01)
(Continued)

(52) U.S. Cl.
CPC ....... *H01M 50/20* (2021.01); *H01M 10/0481* (2013.01); *H01M 50/209* (2021.01); *H01M 50/264* (2021.01); *H01M 2220/20* (2013.01)

(58) Field of Classification Search
CPC ........... H01M 50/20–211; H01M 50/218–298; H01M 50/50–526; H01M 50/543;
(Continued)

(56) References Cited

U.S. PATENT DOCUMENTS

2014/0220391 A1* 8/2014 Fujii ..................... H01M 50/20
429/7
2015/0024253 A1* 1/2015 Noh ...................... H01M 50/20
429/156
(Continued)

FOREIGN PATENT DOCUMENTS

| CN | 203631621 U | * | 6/2014 | .............. H01M 2/10 |
| JP | 2016-122572 A | | 7/2016 | |
| WO | WO-2018235556 A1 | * | 12/2018 | ........ H01M 10/0413 |

OTHER PUBLICATIONS

Machine Translation of Pan et al., CN 203631621, originally published Jun. 4, 2014 (Year: 2014).*

*Primary Examiner* — Jonathan Crepeau
*Assistant Examiner* — Jacob Buchanan
(74) *Attorney, Agent, or Firm* — Paratus Law Group, PLLC

(57) ABSTRACT

A battery module includes: a cell stack including a first surface being a surface on one end in the first direction, a second surface being a surface on the other end in the first direction, a third surface being a surface on one end in a second direction that is a direction orthogonal to the first direction, a fourth surface being a surface on the other end in the second direction, a fifth surface being a surface on one end in a third direction orthogonal to the first direction and the second direction, and a sixth surface being a surface on the other end in the third direction; and a restraining member that restrains the cell stack. The restraining member includes: a pair of restraining plates restraining the cell stack in the first direction; and a pair of sandwiching plates sandwiching the cell stack in the third direction.

13 Claims, 12 Drawing Sheets

(51) Int. Cl.
*H01M 50/209* (2021.01)
*H01M 50/264* (2021.01)

(58) Field of Classification Search
CPC ............. H01M 10/04; H01M 10/0481; H01M 10/052–0525; H01M 10/60–627; H01M 10/65; H01M 10/653; H01M 10/655–656; B60L 50/60; B60L 50/64–66
See application file for complete search history.

(56) References Cited

U.S. PATENT DOCUMENTS

| | | | |
|---|---|---|---|
| 2015/0144409 A1* | 5/2015 | Fujii | H02J 7/007 180/65.1 |
| 2016/0013467 A1* | 1/2016 | Kawata | H01M 50/502 429/159 |
| 2016/0036105 A1* | 2/2016 | Toshioka | H01M 10/613 429/120 |
| 2016/0149180 A1* | 5/2016 | To | H01M 10/6555 429/120 |
| 2016/0156006 A1* | 6/2016 | Hoshino | H01M 10/6556 429/96 |
| 2016/0190526 A1 | 6/2016 | Yamada et al. | |
| 2020/0099027 A1* | 3/2020 | Ishibashi | B60K 6/28 |

\* cited by examiner

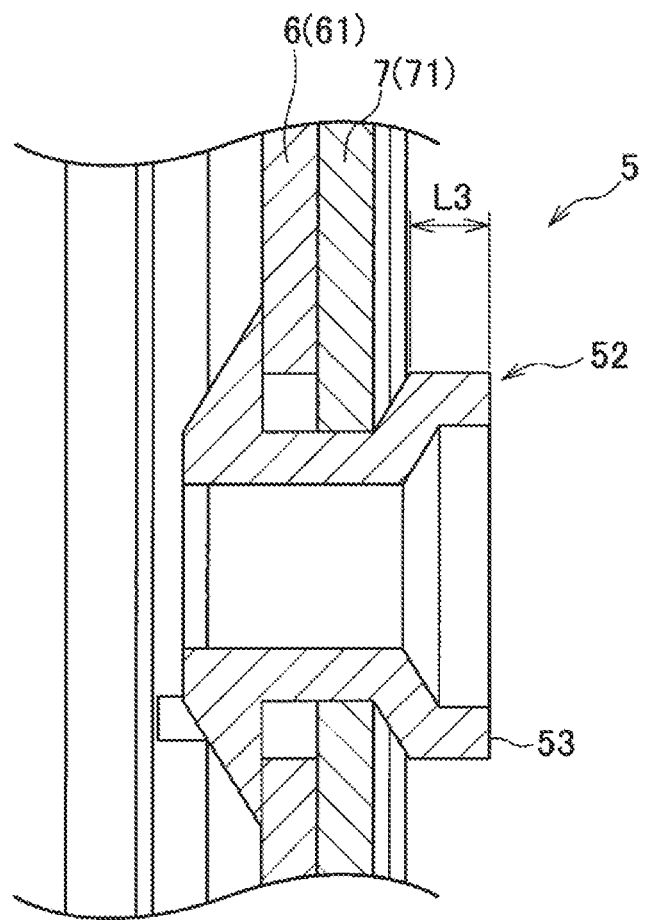
FIG.9
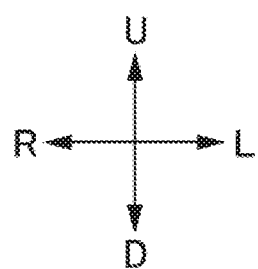

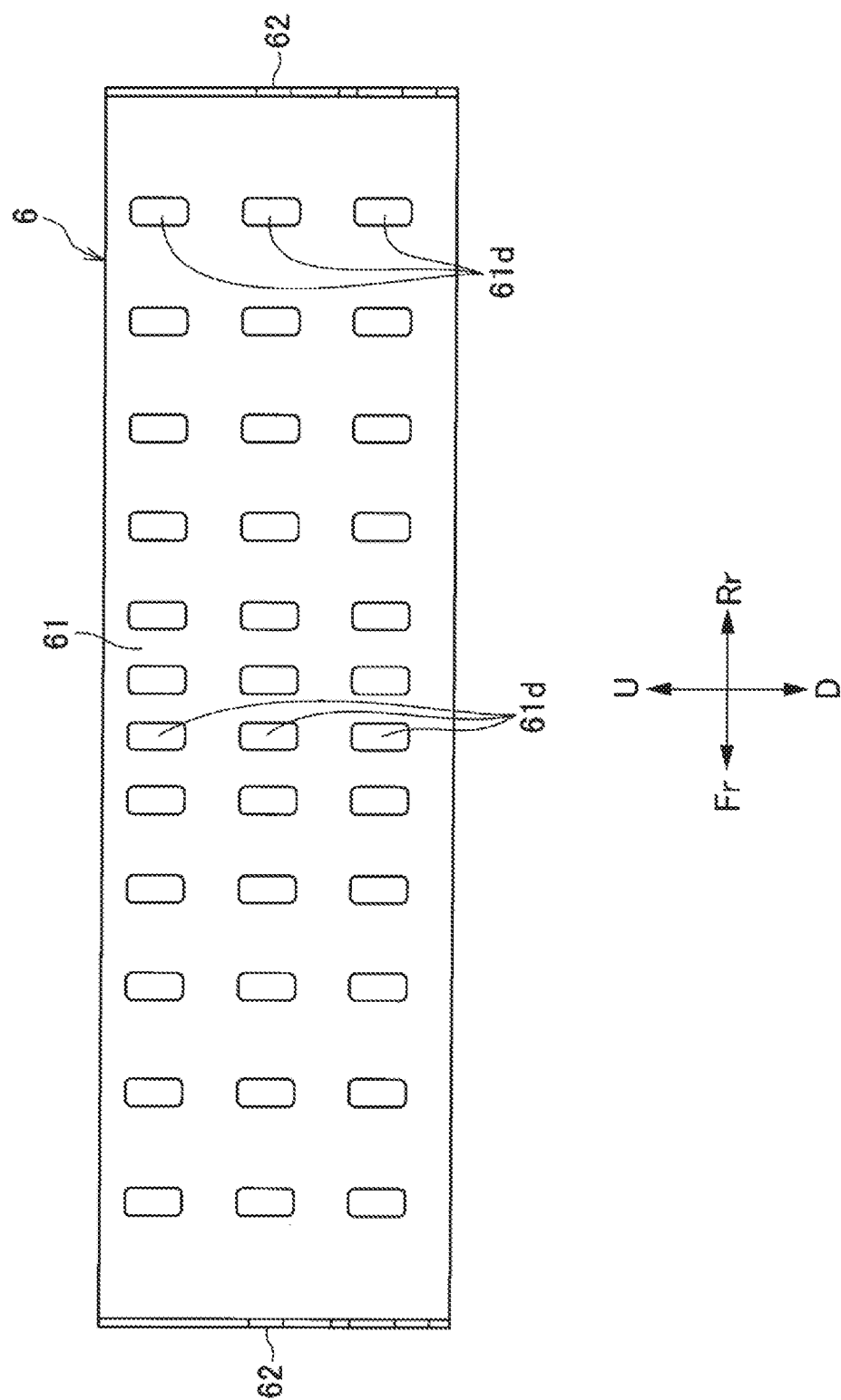

BATTERY MODULE

CROSS-REFERENCE TO RELATED APPLICATIONS

The present application claims the benefit of priority of Japanese Patent Application No. 2019-022686, filed on Feb. 12, 2019, the content of which is incorporated herein by reference.

TECHNICAL FIELD

The present invention relates to a battery module mounted on an electric vehicle or the like.

BACKGROUND ART

In the related art, a battery module is mounted on an electric vehicle and the like, JP-A-2016-12272 discloses a battery module (battery pack) including a cell stack (storage module) in which a plurality of cells (storage batteries) are stacked, a pair of end plates provided on both ends of the cell stack in a stacking direction, and a pair of restraining members (restraining bands) that extend along side surfaces parallel to the cell stack and are connected to the pair of end plates to restrain the cell stack.

In this kind of battery module, due to the expansion of cells caused by a temperature change or aging, a load (hereinafter, appropriately referred to as cell thickness restraining reaction force) of the battery module in the cell stacking direction is generated. Recently, accompanying with the increase in capacity and energy density of cells, cell thickness restraining reaction force increases in order to store more active materials in the cells.

However, the pair of restraining members disclosed in JP-A-2016-122572 restrains a cell stack in a cell stacking direction and an orthogonal direction (vertical direction) thereof, and there is a concern in that stress generated in the stacking direction which is caused by expansion of cells and stress occurring due to the suppression of the cell stack in the vertical direction may act to the pair of restraining members in a composite manner to generate stress concentration.

SUMMARY

The present invention provides a battery module that can relax the stress concentration in the restraining member.

According to an aspect of the present invention, there is provided a battery module including: a cell stack that is formed by stacking a plurality of cells having positive electrode terminals and negative electrode terminals in a first direction, and includes a first surface that is a surface on one end in the first direction, a second surface that is a surface on the other end in the first direction, a third surface that is a surface on one end in a second direction that is a direction orthogonal to the first direction, a fourth surface that is a surface on the other end in the second direction, a fifth surface that is a surface on one end in a third direction orthogonal to the first direction and the second direction and on which the positive electrode terminals and the negative electrode terminals are disposed, and a sixth surface that is a surface on the other end in the third direction; and a restraining member that restrains the cell stack, wherein: the restraining member includes: a pair of restraining plates that have restraining plate bodies disposed along the third surface and the fourth surface of the cell stack and restrain the cell stack in the first direction; and a pair of sandwiching plates that have sandwiching plate bodies disposed on the third surface and the fourth surface of the cell stack and sandwich the cell stack in the third direction.

According to the present invention, because the stress generated in the first direction (stacking direction) caused by the expansion of cells and the stress generated in the third direction are separated to be borne by separate components, compared with a case where one component has both functions, the stress concentration can be relaxed.

BRIEF DESCRIPTION OF THE DRAWINGS

FIG. 9 is an enlarged cross-sectional view taken along the line B-B in FIG. 8;

FIG. 12 is a side view of a restraining plate according to a modified example.

DESCRIPTION OF EMBODIMENTS

Figure 1:
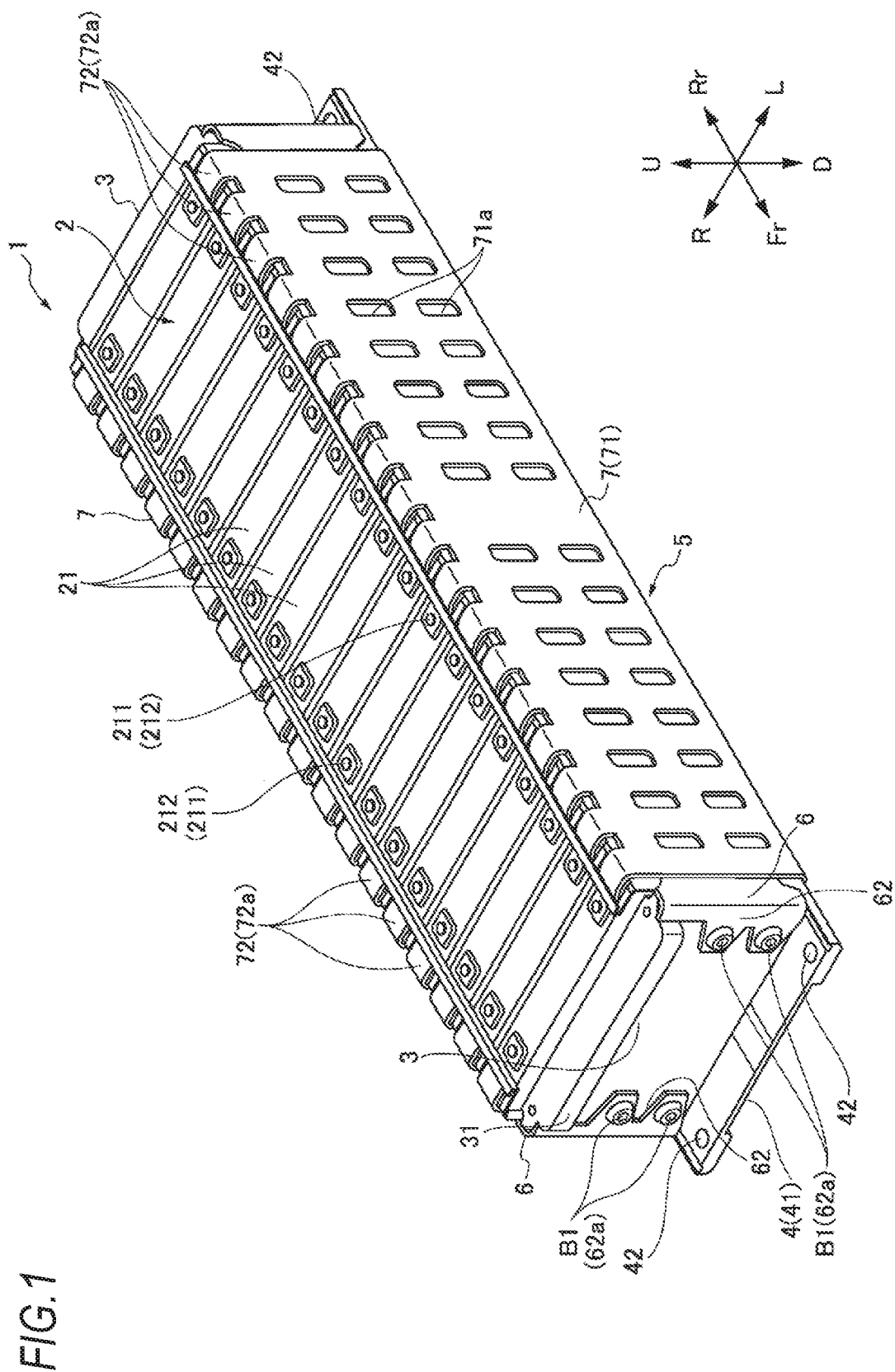
FIG. 1 is a perspective view of a battery module according to a first embodiment of the present invention as viewed obliquely from above.

Hereinafter, each embodiment of a battery module of the present invention is described with reference to drawings. The drawings are viewed in the direction of reference numerals.

Figure 2:
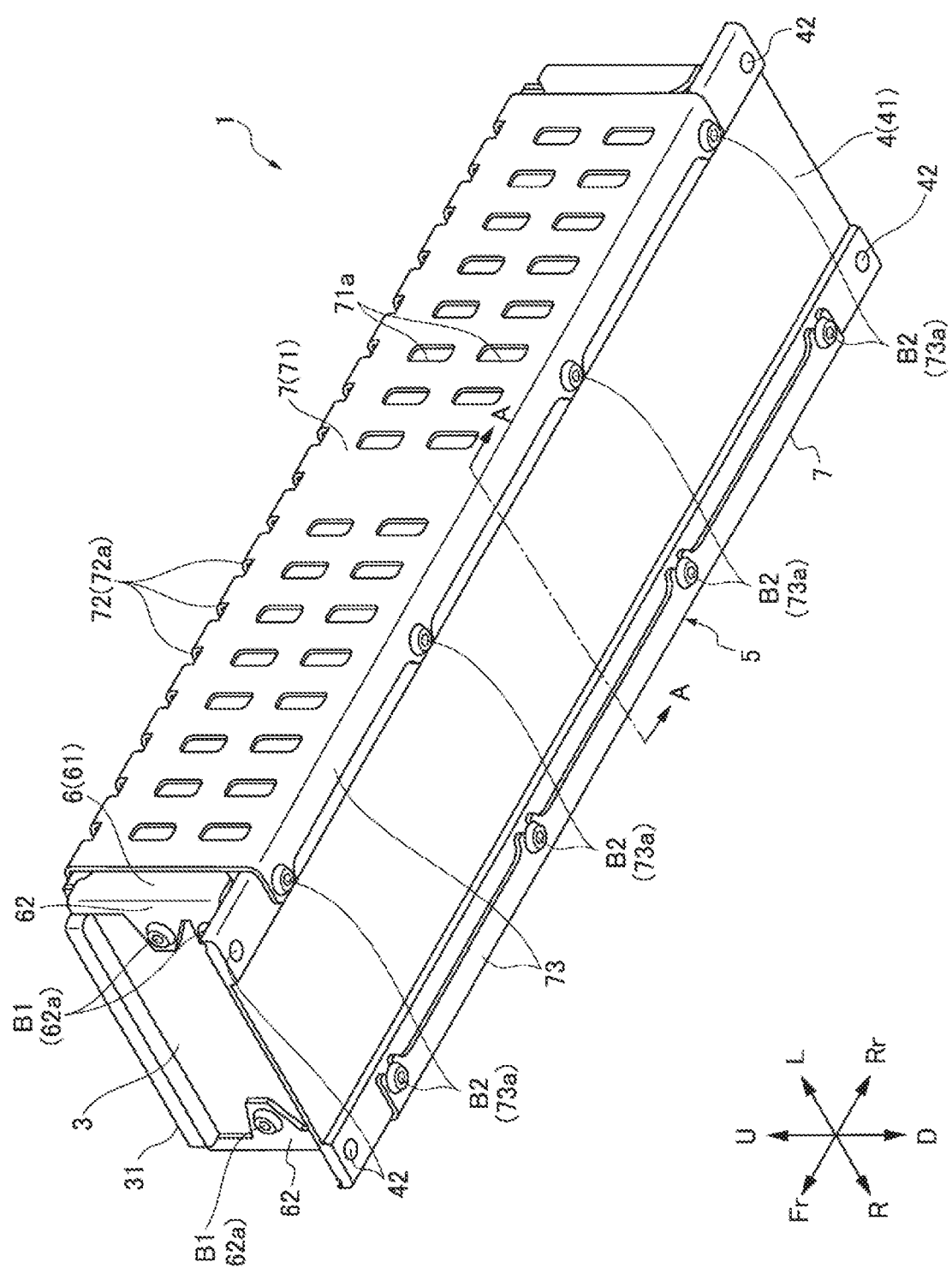
FIG. 2 is a perspective view of the battery module according to the first embodiment of the present invention as viewed obliquely from below.
Figure 3:
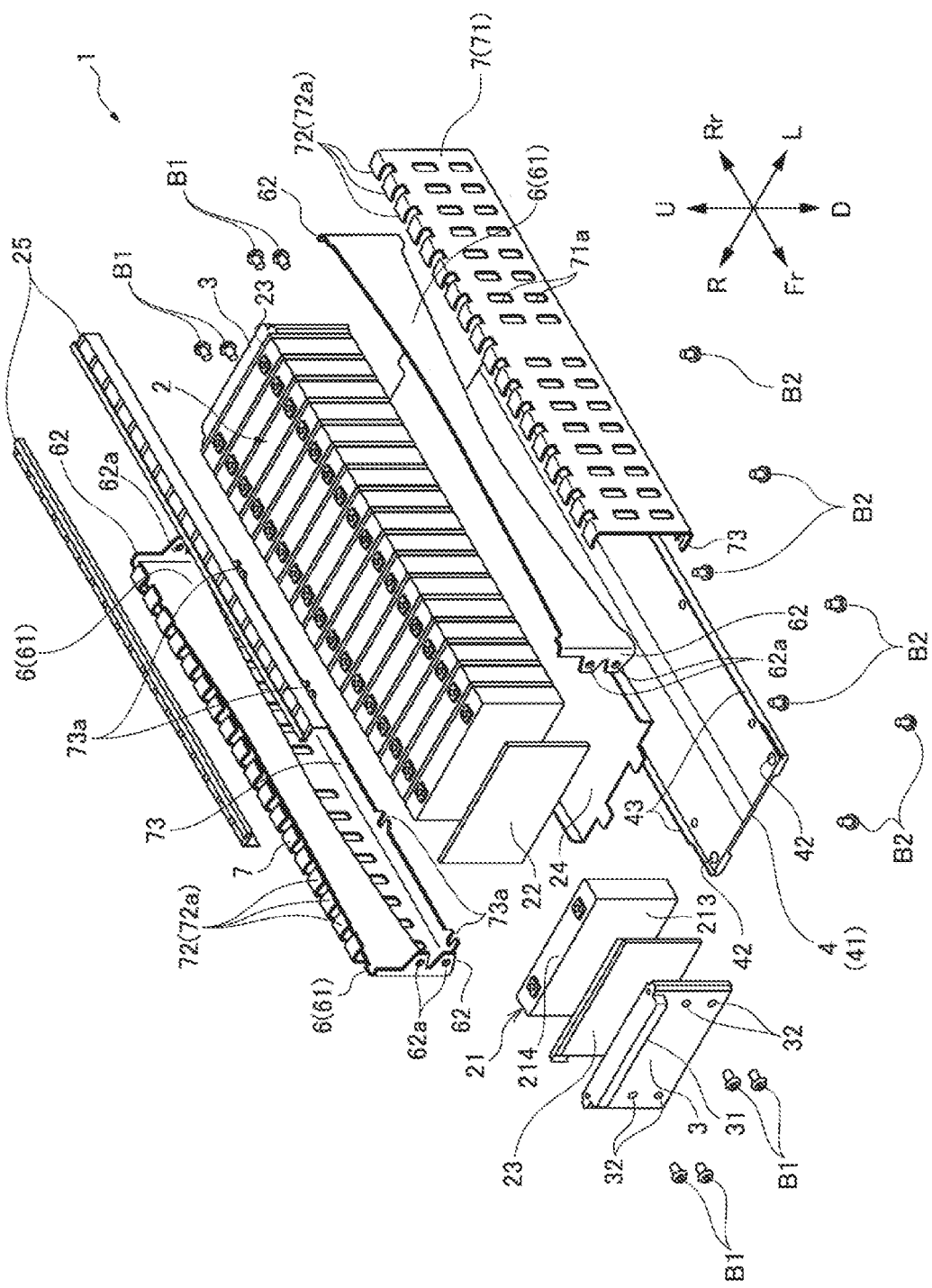
FIG. 3 is an exploded perspective view of the battery module according to the first embodiment of the present invention.

As illustrated in FIGS. 1 to 3, a battery module 1 according to a first embodiment of the present invention includes a cell stack 2 that is formed by stacking a plurality of cells 21 in a front-rear direction (first direction) and has a front surface (first surface) and a rear surface(second surface) facing with each other in the front-rear direction, a left surface (third surface) and a right surface (fourth surface) facing with each other in a left-right direction (second direction) orthogonal to the front-rear direction, and an upper surface (fifth surface) and a lower surface (sixth surface) facing with each other in a vertical direction (third direction) orthogonal to the front-rear direction and the left-right direction; a pair of end plates 3 that are disposed on the front surface and the rear surface of the cell stack 2; a lower frame 4 that are disposed on the lower surface of the cell stack 2; and restraining members 5 that restrain the cell stack 2.

In the present specification, for easier and more specific description, a stacking direction of the cells 21 is defined as the front-rear direction, directions orthogonal to the stacking direction of the cells 21 are defined as the left-right direction and the vertical direction. The directions do not relate to the front-rear direction or the like of a product on which the battery module 1 is mounted.

That is, when the battery module 1 is mounted on a vehicle, the stacking direction of the cells 21 may coincide with the front-rear direction of the vehicle, may be the vertical direction or the left-right direction of the vehicle, or may be a direction that is inclined to these directions. In the drawings, the front of the battery module 1 is indicated by Fr, the rear is indicated by Rr, the left side is indicated by L, the right side is indicated by R, the upper side is indicated by U, and the lower side is indicated by D.

The cell stack 2 includes the plurality of cells 21 and a plurality of first insulating members 22 alternately stacked in the front-rear direction. The pair of end plates 3 are disposed respectively on the front surface and the rear surface of the cell stack 2 in an insulating state via second insulating members 23, the lower frame 4 is disposed on the lower surface of the cell stack 2 in an insulating state via a third insulating member 24, the restraining members 5 are disposed respectively on the left surface and the right surface of the cell stack 2 in an insulating state via slight gaps, and a pair of fourth insulating members 25 are disposed on a left end portion and a right end portion on the upper surface of the cell stack 2.

The cell 21 has a square shape of a hexahedron in which a positive electrode terminal 211 and a negative electrode terminal 212 are provided on the upper surface. The cell 21 is formed by accommodating an electrode body (not illustrated) in a bottomed cylindrical cell body 213 and then welding a lid member 214 to be an upper surface of the cell 21. When the cell 21 expands due to a temperature change or aging of the electrode body, the cell 21 expands to enlarge a welded portion (not illustrated), and thus it is desirable to suppress the expansion of the welded portion.

The pair of end plates 3 come into contact with the front surface and the rear surface of the cell stack 2 via the second insulating members 23 and block a load (hereinafter, also also referred to as cell thickness restraining reaction force appropriately) in the cell stacking direction of the cell stack 2. The end plate 3 is formed by using, for example, an aluminum die cast material and has a flat plate shape as a whole. On the upper portion of the end plate 3, a swelling portion 31 that swells outward in the stacking direction of the cell 21 is integrally provided below the welded portion of the cell 21 and near the welded portion. The end plate 3 enables the swelling portion 31 to suppress of the expansion of the welded portion of the cell 21 and also equalizes load acting on the end plate 3 in the vertical direction.

The height of the end plate 3 in the vertical direction is lower than the height of the cell 21 and is higher than the height of the electrode body that is present inside the cell 21. The end plate 3 blocks the expansion of the cells 21 by the electrode body, and the weight of the end plate 3 can be reduced by suppressing the height dimension of the end plate 3.

The lower frame 4 is a plate-like member formed using, for example, an aluminum extruded material and includes a lower frame body portion 41 that extends along the lower surfaces of the cell stack 2 and the end plates 3; a plurality of fixing portions 42 that fix a module supporting structure (not illustrated) that supports the battery module 1; and a pair of guide portions 43 that stand upward from both left and right end portions of the lower frame body portion 41 and extend in the front-rear direction. The guide portions 43 stand upward from both left and right end portions of the lower frame body portion 41 along the left surface and the right surface of the cell stack 2 and regulate the deviation of the cell stack 2 in the left-right direction when the cell stack 2 vibrates.

Figure 4:
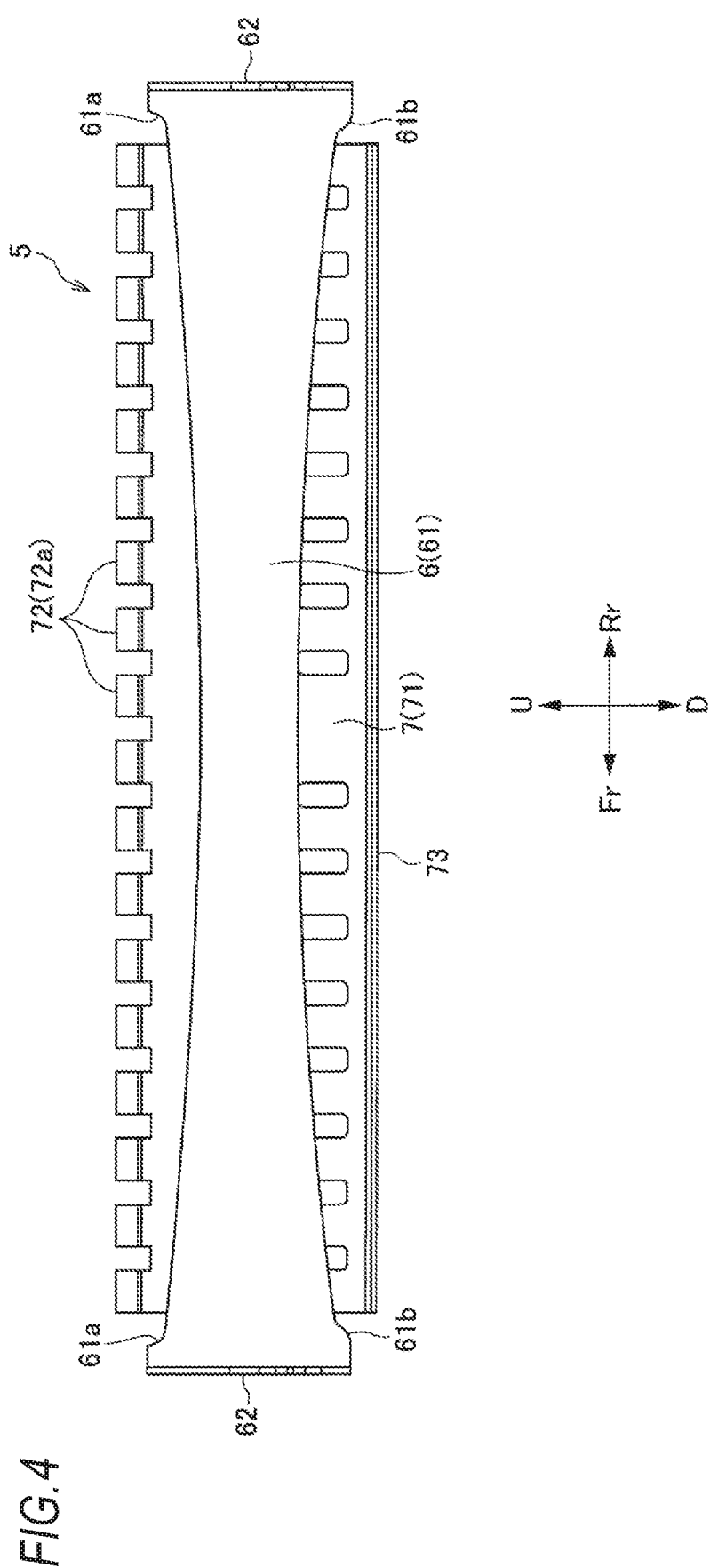
FIG. 4 is an inner side view of a restraining member in FIG. 1.
Figure 5:
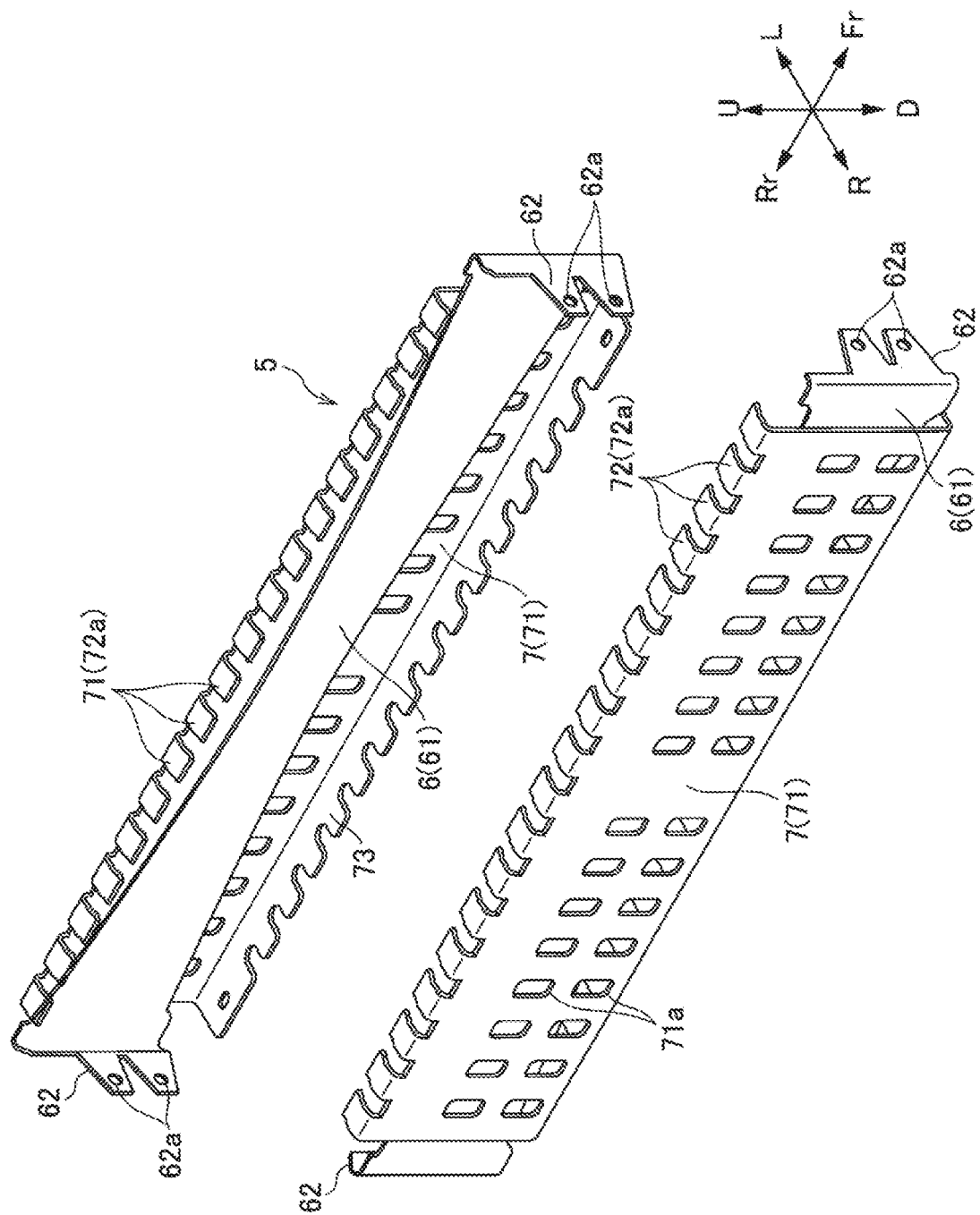
FIG. 5 is a. perspective view of the restraining member in FIG. 1 as viewed obliquely from above.

As illustrated in FIGS. 4 and 5, the restraining members 5 include a pair of restraining plates 6 that have restraining plate body portions 61 disposed along the left surface and the right surface of the cell stack 2 and restrain the cell stack 2 in the cell stacking direction; and a pair of sandwiching plates 7 that have sandwiching plate body portions 71 disposed long the left surface and the right surface of the cell stack 2 and sandwich the cell stack 2 in the vertical direction. According to the restraining members 5, the stress that is generated in the cell stacking direction by the expansion of the cells 21 and the stress that is generated by the suppression of the cell stack 2 in the vertical direction are separated to be borne by separate components. Therefore, compared with a case where one component has both functions, the stress concentration can be relaxed.

The restraining plates 6 has the restraining plate body portions 61 that are formed by pressing a metal plate material and disposed along the left surface and the right surface of the cell stack 2, and a pair of restraining plate fixing portions 62 that are integrally formed to continue to the restraining plate body portions 61, face with the end plates 3 in the cell stacking direction, and are fixed to the pair of end plates 3.

A plurality of fastening portions 62a that fasten the end plates 3 via bolts B1 are provided in the restraining plate fixing portions 62. The fastening portions 62a have round holes into which the bolts B1 are suitably inserted, and the restraining plate fixing portions 62 are fastened to the end plates 3 by screwing the bolts B1 inserted to the round holes into screw holes 32 of the end plates 3.

The width of the restraining plate body portion 61 in the vertical direction is narrowed down in the center portion in the cell stacking direction compared with both ends. According to the restraining plate 6, the area near the intersecting portion between the restraining plate body portion 61 and the restraining plate fixing portion 62 increases, the stress generated in the restraining plate 6 according to the expansion of the cells 21 can be dispersed. Because the width of the restraining plate body portion 61 in the vertical direction is small in the center portion, the restraining plate body portion 61 becomes easily extends in the cell stacking direction, or the dimension increase of the cell stack 2 in the stacking direction caused by the expansion of the cells 21 can be allowed to a certain extent.

The restraining plate body portions 61 is curved such that the width in the vertical direction becomes narrower from both ends to the center portion in the cell stacking direction. According to the restraining plate 6, the stress generated in the restraining plate body portions 61 becomes excessively large can be suppressed.

Figure 6:
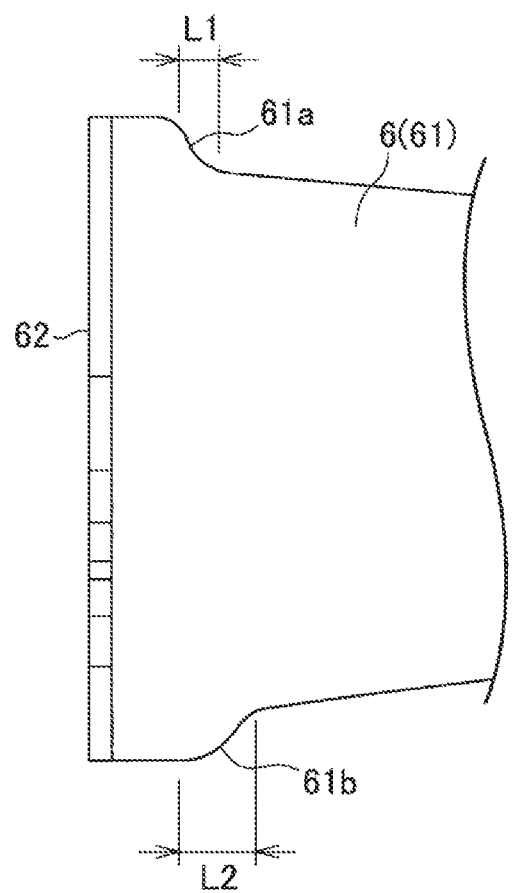
FIG. 6 is an enlarged side view of a main part of a restraining plate of FIG. 1.
Figure 6:
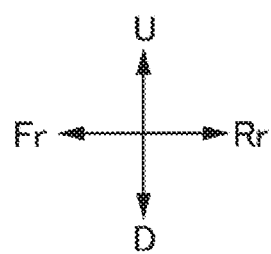

As illustrated in FIG. 6, the restraining plate body portion 61 has step portions 61a and 61b in which the width in the vertical direction becomes narrower toward the center portion in the cell stacking direction, in the both end portions in the cell stacking direction. In other words, in the both end portions in the cell stacking direction, the step portions 61a and 61b broaden the width of the restraining plate body portion 61 in the vertical direction, a. portion near the intersecting portion between the restraining plate body portions 61 and the restraining plate fixing portions 62 in which the stress easily concentrates can be reinforced. The stress acting to the restraining plate 6 can be appropriately dispersed by adjusting the stiffness of the restraining plate 6 with the step portions 61*a* and 61*b*.

As described above, since the cell 21 expands to enlarge the welded portion, the stress generated in the restraining plate 6 increases on the upper side of the cell 21. However, in the battery module 1 of the present embodiment, because the swelling portion 31 that swells outward in the stacking direction of the cell 21 is integrally provided on the upper portion of the end plate 3, the stress generated in the restraining plate 6 conversely increases on the lower side of the cell 21. Here, in the present embodiment, the stress generated in the restraining plate 6 is equalized by lengths L1 and L2 of the vertical step portions 61*a* and 61*b* in the cell stacking direction.

More specifically, with respect to the lengths L1 and L2 of the step portions 61*a* and 61*b* in the cell stacking direction, the upper step portion 61*a* becomes narrower than the lower step portion 61*b*. According to the battery module 1, the stress generated in the end plate 3 and the restraining plate 6 can be equalized in the vertical direction.

When the swelling portion 31 is not formed on the end plate 3, the stress generated in the restraining plate 6 increases on the upper side of the cell 21, and. thus it is desirable that the lengths L1 and L2 of the step portions 61*a* and 61*b* in the cell stacking direction are adjusted such that the lower step portion 61*b* becomes narrower than the upper step portion 61*a*. It is preferable that the lengths L1 and L2 of the step portions 61*a* and 61*b* in the cell stacking direction are appropriately adjusted by positions (positions of the fastening portions 62*a* of the restraining plate fixing portions 62) for restraining the cells 21.

As adjusting means for equalizing the stress generated in the restraining plate 6 in the vertical direction, there is means for offsetting the center of gravity of the restraining plate body portion 61 in the vertical direction. For example, when the stress generated in the restraining plate 6 increases on the upper side of the cells 21, the center position of the width in the vertical direction in the center portion of the restraining plate body portion 61 is offset on the upper side than the center positions of the widths in the vertical direction in the both end portions. According to the restraining plates 6, without providing the step portions 61*a* and 61*b*, the stress generated in the restraining plate 6 can be equalized in the vertical direction. If the step portions 61*a* and 61*b* are used together, the stress with more accuracy can be equalized.

With respect to the restraining plate 6 according to the present embodiment, in order to obtain an effect of dispersing the stress generated in the restraining plate 6 caused by the expansion of the cells 21 and allowing the dimension increase of the cell stack 2 in the stacking direction which is caused by the expansion of the cells 21 to an extent, the width of the restraining plate body portion 61 in the vertical direction becomes narrower in the center portion than in the both end portions in the cell stacking direction, but the same effect may be obtained by causing the width of the restraining plate body portion 61 in the vertical direction to be even and adjusting the number or a total area of lightening holes formed in the restraining plate body portion 61.

As illustrated in FIG. 12, the restraining plate 6 in this modification is realized by the restraining plate body portion 61 in which the number of lightening holes 61*d* is larger or a total area of the lightening holes 61*d* is greater in the center portion than in the both end portions in the cell stacking direction. That is, the number of lightening holes 61*d* near the intersecting portion between the restraining plate body portion 61 and the restraining plate fixing portions 62 is small, or a total area of the lightening holes 61*d* is small.

Therefore, the stress generated in the restraining plates 6 caused by the expansion of the cells 21 can be dispersed. In the restraining plate body portion 61, the number of lightening holes 61*d* is larger or the total area of the lightening holes 61*d* is greater in the center portion than in the both end portions. Therefore, elongation in the cell stacking direction becomes easy, or the dimension increase of the cell stack 2 in the stacking direction caused by the expansion of the cells 21 can be allowed to an extent.

As illustrated in FIGS. 4 and 5, the sandwiching plate 7 includes the sandwiching plate body portions 71 that are formed by pressing a metal plate material and disposed along the left surface and the right surface of the cell stack sandwiching plate elastic portions 72 that extend from the upper end portion of the sandwiching plate body portions 71 along the upper surface of the cell stack 2; and a sandwiching plate fixing portion 73 that extends from the lower end portion of the sandwiching plate body portions 71 along the lower surface of the lower frame 4.

The sandwiching plate elastic portion 72. has elasticity in which the upper surface of the cell stack 2 is pressed along the lower surface of the cell stack 2. Accordingly, the sandwiching plate elastic portions 72 and the sandwiching plate fixing portion 73 sandwich the fourth insulating members 25, the cell stack 2, and the lower frame 4 in the vertical direction, in the left end portion and the right end portion of the cell stack 2.

The sandwiching plate elastic portions 72 of the present embodiment is formed by a plurality of elastic pieces 72*a* arranged in the front-rear direction and the number and the positions of the elastic pieces 72*a* correspond to the number and the positions of the cells 21 stacked in the front-rear direction. The sandwiching plate elastic portions 72 have appropriate elasticity and individually and elastically maintain the plurality of cells 21.

Figure 7:
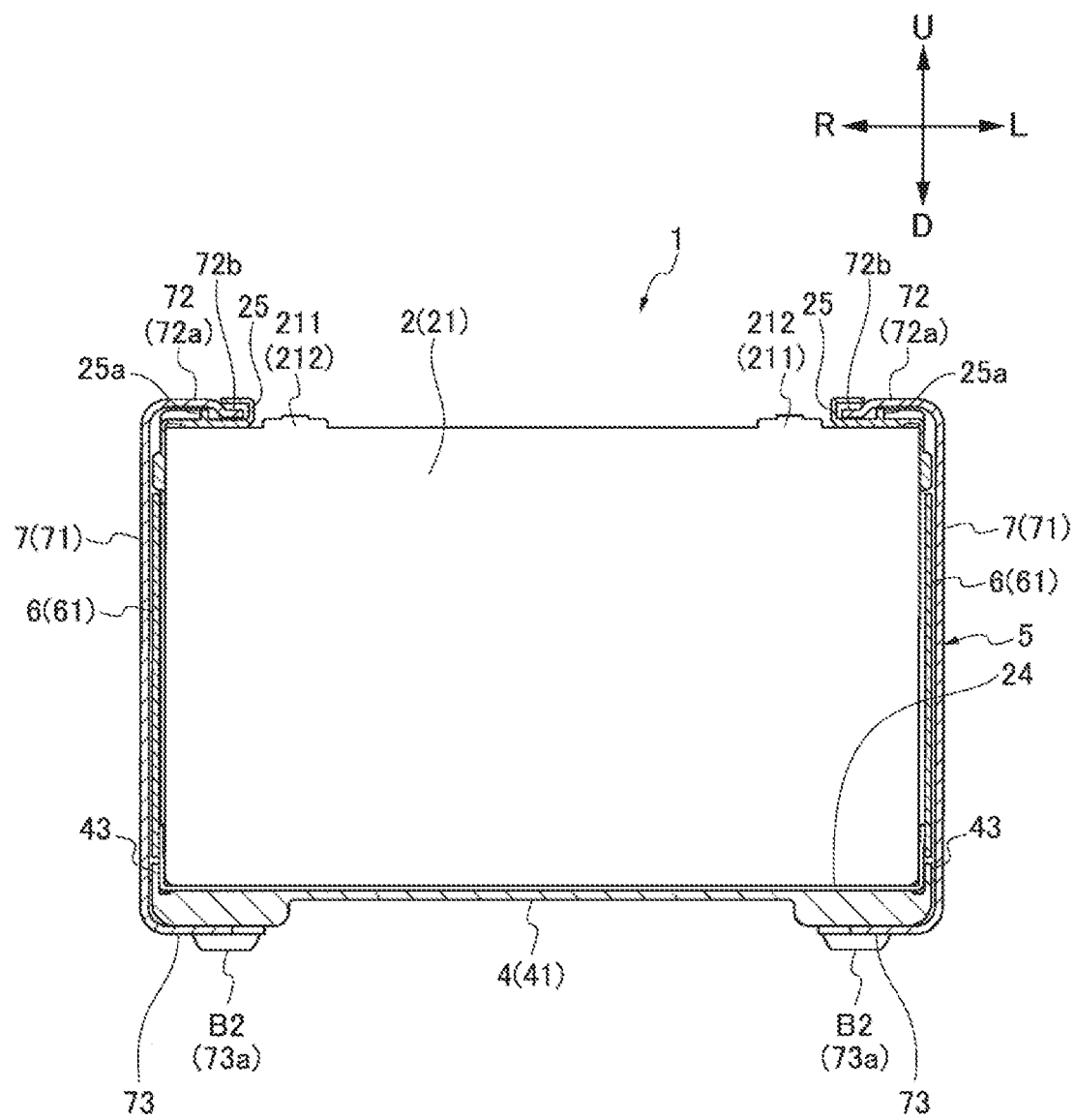
FIG. 7 is a cross-sectional view taken along the line A-A in FIG. 2.

As illustrated in FIG. 7, the restraining plate body portions 61 of the restraining plates 6 are disposed between the cell stack 2 and the sandwiching plate body portions 71. According to the battery module 1, the sandwiching plate body portions 71 act to press the restraining plate body portions 61 to the cell stack 2 by the elasticity of the sandwiching plate elastic portions 72, and thus the protrusion of the restraining plates 6 can be prevented.

The pair of guide portions 43 of the lower frame 4 described above are disposed between the sandwiching plate body portion 71 and the left surface of the cell stack 2 and between the sandwiching plate body portion 71 and the right surface of the cell stack 2. Viewed in the cell stacking direction, the restraining plate body portions 61 and the guide portions 43 are not overlapped with each other in the vertical direction. According to the battery module 1, the restraining plates 6 are disposed in the gap formed by the sandwiching plate body portions 71 and the guide portions 43 of the lower frame 4, to effectively use spaces.

The sandwiching plates 7 are fixed or engaged to the upper surface side of the cell stack 2 and the lower surface side of the cell stack 2, and the protrusion of the sandwiching plates 7 in the left-right direction is regulated. More specifically, the fourth insulating member 25 has protruding portions 25*a* that protrude upward from the upper surface side of the cell stack 2, and engaging portions 72*b* formed in the front end portions of the sandwiching plate elastic portions 72 engage with the protruding portions 25*a* in the left-right direction, to regulate the protrusions of the sandwiching plate elastic portions 72 in the left-right direction.

Therefore, a dedicated component for preventing the protrusion of the sandwiching plate elastic portions 72 in the left-right direction is not required.

The sandwiching plate elastic portions 72 may engage with the first insulating members 22 or the end plates 3 in the left-right direction. Also in this manner, a dedicated component for preventing the protrusion of the sandwiching plate elastic portions 72 in the left-right direction is not required.

The engaging portions of the sandwiching plate elastic portions 72 can relatively move to the fourth insulating members 25 and the cell stack 2 in the cell stacking direction.

Therefore, the excessive generation of stress in the sandwiching plates 7 due to the expansion of the cells 21 can be prevented.

The sandwiching plate fixing portion 73 include a plurality of fastening portions 73a that are fastened to the lower frame 4 via bolts B2. The fastening portion 73a is a notch portion that closes in the left-right direction and can mount the sandwiching plate 7 in a state of temporarily fixing the bolts B2 to the lower frame 4 in the left-right direction. The position of fixing the sandwiching plate 7 to the lower frame 4 may be the guide portions 43.

A plurality of lightening holes 71a are formed in the sandwiching plate body portions 71. That is, by dividing the restraining member 5 into the restraining plate 6 and the sandwiching plate 7, compared with a case of an integral type, the stiffness required in the sandwiching plate 7 can be reduced, and thus the weight of the sandwiching plates 7 can be reduced by providing the plurality of lightening holes 71a. Viewed in the left-right direction, the lightening holes 71a are formed not to be overlapped with the elastic pieces 72a of the sandwiching plate elastic portions 72 in the cell stacking direction. Accordingly, while the elastic force of the sandwiching plate elastic portions 72 is maintained, the weight of the sandwiching plate 7 can be reduced.

Subsequently, a battery module according to another embodiment of the present invention is described with reference to FIGS. 8 to 11. However, only differences from the first embodiment are described, and for the configurations common to the first embodiment, the same reference numerals are used, to cite the description of the first embodiment.

Figure 8:
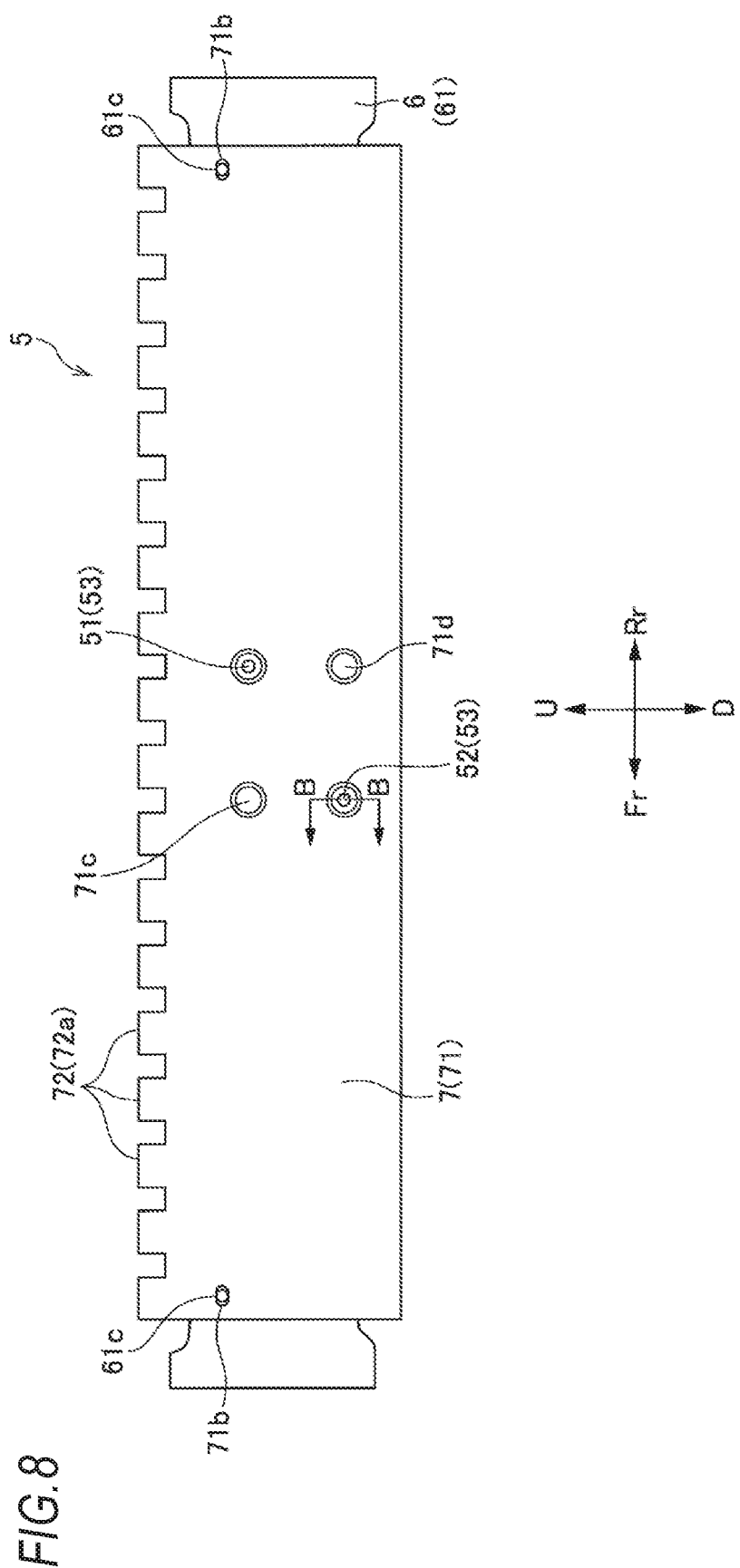
FIG. 8 is a side view of a restraining member used in a battery module according to a second embodiment of the present invention.
Figure 10:
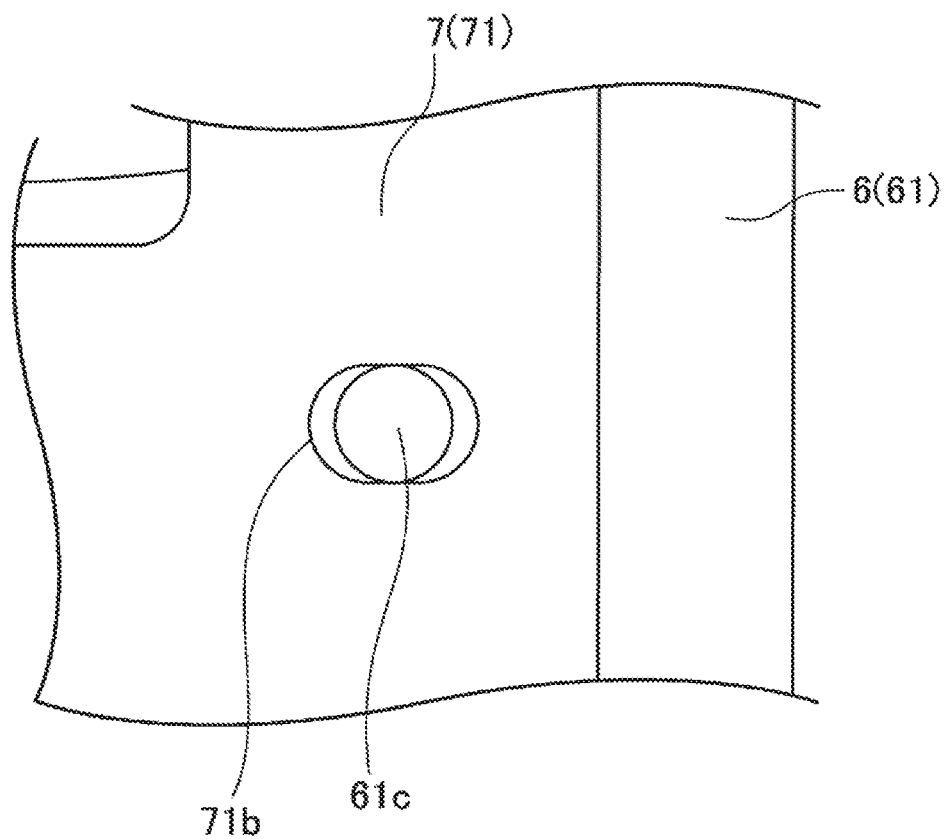
FIG. 10 is an enlarged side view of a main part of FIG. 8.

As illustrated in FIGS. 8 to 10, the restraining member 5 used in the battery module 1 according to a second embodiment is different from the embodiment in that the restraining plate body portions 61 and the sandwiching plate body portions 71 are fixed near the center portion in the cell stacking direction. According to the restraining member 5, while the influence caused by the expansion of the cells 21 is suppressed, the protrusion of the sandwiching plates 7 in the left-right direction can be prevented.

Specifically, the restraining plate body portions 61 and the sandwiching plate body portions 71 have first fixing portions 51 near the center portion in the cell stacking direction and second fixing portions 52 in a position deviated from the first fixing portion 51 in the cell stacking direction and the vertical direction, and are fixed with each other by fixing members 53 in the first fixing portion 51 and the second fixing portion 52. As illustrated in FIG. 9, the fixing members 53 according to the present embodiment are rivets, and after the restraining plate body portions 61 and the sandwiching plate body portions 71 are fixed, a portion thereof protrudes from the outer surface of the sandwiching plate body portions 71 by a predetermined length L3. The restraining plate body portions 61 and the sandwiching plate body portions 71 may be fixed by spot welding in the first fixing portion 51 and the second fixing portion 52.

The sandwiching plate body portion 71 has a first recess 71c and a second recess 71d at two different vertices of a virtual quadrangle having a straight line passing through the first fixing portion 51 and the second fixing portion 52 as a diagonal. According to the restraining member 5, when two battery modules 1 are disposed side by side, the fixing members 53 of one battery module 1 are positioned in the first recess 71c and the second recess 71d of the sandwiching plates 7 of the other battery module 1, such that the interference of the fixing members 53 can be prevented. A pair of sandwiching plates 7 can be configured with one kind of sandwiching plates 7.

As illustrated in FIGS. 8 and 10, the restraining plate body portion 61 has positioning projections 61c in the both end portions in the cell stacking direction, and the sandwiching plate body portion 71 has the positioning hole portions 71b that engage with the positioning projections 61c. The length of the positioning hole portion 71b in the cell stacking direction becomes longer than that of the positioning projection 61c. According to the restraining member 5, the assembly workability between the restraining plate 6 and the sandwiching plate 7 increased by the positioning projections 61c and the positioning hole portions 71b provided in the restraining plate body portion 61 and the sandwiching plate body portion 71 increases, and excessive stress can be prevented from being generated in the sandwiching plate 7 due to the expansion of the cells 21.

Positioning projections may be formed in the sandwiching plate body portions 71, and positioning hole portions may be formed in the restraining plate body portions 61. The positioning projections 61c and the positioning hole portions 71b may be disposed on any one end portion, not on the both end portions of the restraining members 5 in the cell stacking direction.

Figure 11:
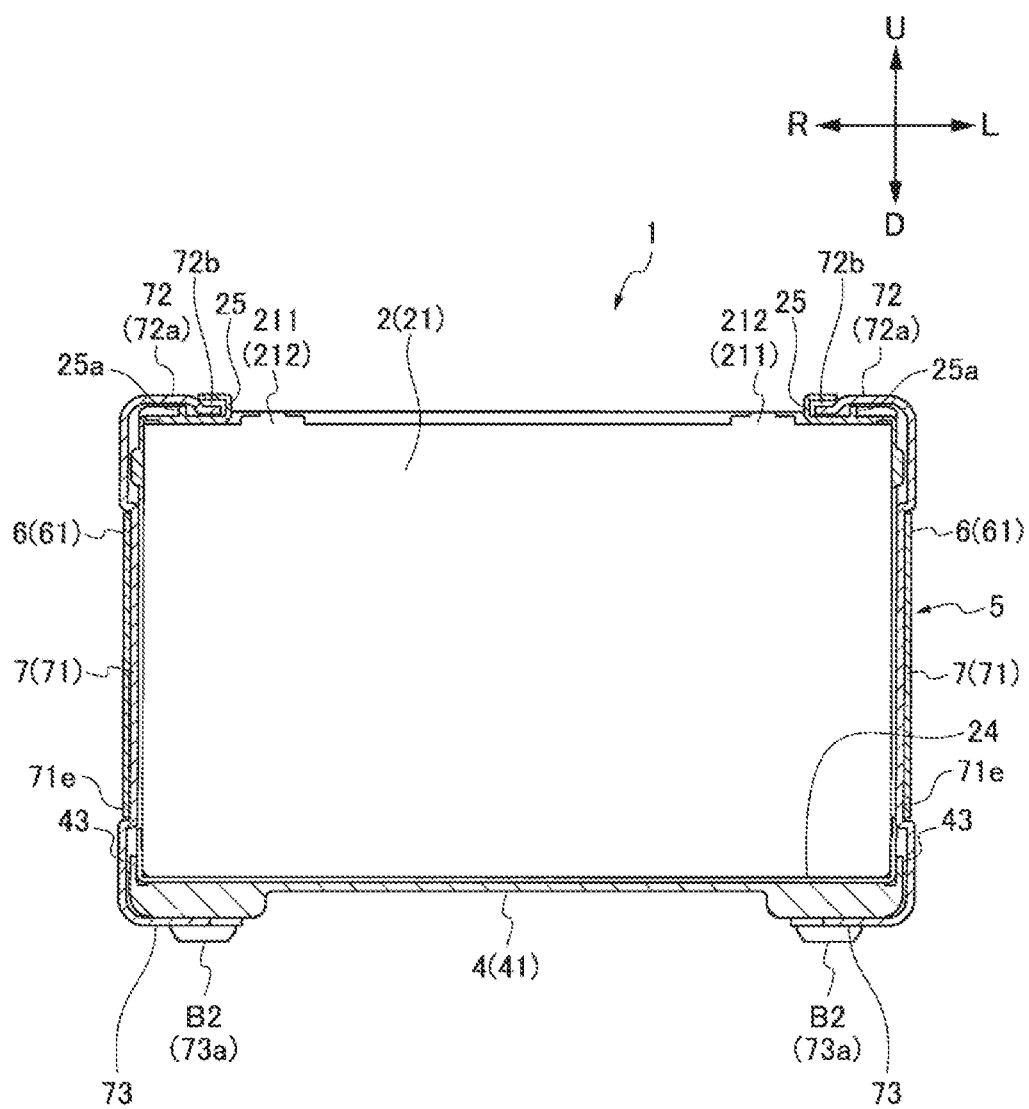
FIG. 11 is a cross-sectional view of a battery module according to a third embodiment of the present invention.

As illustrated in FIG. 11, the restraining members 5 according to a third embodiment are different from the above embodiments in that, the sandwiching plate body portions 71 of the sandwiching plates 7 have recesses 71e that are recessed toward the cell stack 2 and continue to the both ends of the sandwiching plate body portions 71 in the cell stacking direction, and the restraining plate body portions 61 of the restraining plates 6 are accommodated in the recesses 71e. According to the restraining members 5, the restraining plate body portions 61 of the restraining plates 6 are disposed outside the sandwiching plate body portions 71 of the sandwiching plates 7, and protrusions of the sandwiching plates 7 in the left-right direction can be regulated by the restraining plates 6. Since the restraining plate body portions 61 of the restraining plates 6 are accommodated in the recesses 71e, the expansion of the dimension of the battery module 1 in the left-right direction can be suppressed.

In the battery module 1 according to the third embodiment, viewed in the cell stacking direction, the recesses 71e in the vertical direction and the guide portions 43 of the lower frame 4 are not overlapped with each other. According to the battery module 1, the recesses 71e are disposed by using spaces that are present above the guide portions 43, and thus the expansion of the dimensions of the battery module 1 in the left-right direction can be further suppressed.

In the above, the embodiments of the present invention are described, but the present invention is not limited to the above embodiments, and can be appropriately deformed, improved, or the like. For example, in the above embodiment, the restraining members 5 including the pair of restraining plates 6 and the pair of sandwiching plates 7 are exemplified, but the pair of sandwiching plates 7 are not required and can be omitted.

At least the following matters are described in the present specification. In addition, in parentheses, components or the like corresponding to the above embodiment are described, but the present invention is not limited thereto.

(1) A battery module (battery module 1) including a cell stack (cell stack 2) that is formed by stacking a plurality of cells (cells 21) having positive electrode terminals (positive electrode terminals 211) and negative electrode terminals (negative electrode terminals 212) in a first direction (stacking direction), and includes a first surface (front surface) that is a surface on one end in the first direction, a second surface (rear surface) that is a surface on the other end in the first direction, a third surface (left surface) that is a surface on one end in a second direction (left-right direction) that is a direction orthogonal to the first direction, a fourth surface (right surface) that is a surface on the other end in the second direction, a fifth surface (upper surface) that is a surface on one end in a third direction (vertical direction) orthogonal to the first direction and the second direction and on which the positive electrode terminals and the negative electrode terminals are disposed, and a sixth surface (lower surface) that is a surface on the other end in the third direction, and a restraining member (restraining member 5) that restrains the cell stack, in which the restraining member includes a pair of restraining plates (restraining plates 6) that have restraining plate bodies (restraining plate body portions 61) disposed along the third surface and the fourth surface of the cell stack and restrain the cell stack in the first direction, and a pair of sandwiching plates (sandwiching plates 7) that have sandwiching plate bodies (sandwiching plate body portions 71) disposed on the third surface and the fourth surface of the cell stack and sandwich the cell stack in the third direction.

According to (1), since the stress generated in the first direction (stacking direction) caused by the expansion of cells and the stress occurring due to the suppression of the cell stack in the third direction are separated to be borne by separate components. Therefore, compared with a case where one component has both functions, the stress concentration can be relaxed.

(2) The battery module according to (1), in which the sandwiching plates further have sandwiching plate elastic portions (sandwiching plate elastic portions 72) that are formed to be integrated with the sandwiching plate bodies and press the fifth surface of the cell stack toward the sixth surface of the cell stack, and the restraining plate bodies are disposed between the cell stack and the sandwiching plate bodies.

According to (2), because the sandwiching plate bodies act to press the restraining plate bodies toward the cell stack by the elasticity of the sandwiching plate elastic portion, the protrusion of the restraining plate can be prevented.

(3) The battery module according to (2), in which the sandwiching plates are fixed to the fifth surface of the cell stack and the sixth surface of the cell stack.

According to (3), because the sandwiching plates are fixed to the fifth surface of the cell stack and the sixth surface of the cell stack, the protrusion of the sandwiching plates in the second direction can be prevented.

(4) The battery module according to (3), in which the cell stack has insulating members (first insulating members 22) disposed between adjacent cells or insulating members (fourth insulating members 25) disposed on the fifth surface of the cell stack, the insulating members have protruding portions (protruding portions 25*a*) that protrude from the fifth surface in the third direction of the cell stack, and the sandwiching plate elastic portions engage with the protruding portions.

According to (4), because the sandwiching plate elastic portions engage with the protruding portion of the insulating member while sandwiching the cell stack, an additional component for preventing the sandwiching plates from protruding in the second direction is not required.

(5) The battery module according to (3), further including:

end members (end plates 3) disposed both ends of the cell stack, in which the sandwiching plate elastic portions engage with the end members.

According to (5), because the sandwiching plate elastic portions engage with the end members while sandwiching the cell stack, an additional component for preventing the sandwiching plates from protruding in the second direction is not required.

(6) The battery module according to (4) or (5), in which engaging portions (engaging portions 72*b*) of the sandwiching plate elastic portions are movable in the first direction.

According to (6), because the engaging portions of the sandwiching plate elastic portions are movable in the first direction, the generation of the excessive stress in the sandwiching plate due to the expansion of the cells can be prevented.

(7) The battery module according to (2), in which the restraining plate bodies and the sandwiching plate bodies are fixed near the center portion in the first direction.

According to (7), because the restraining plate bodies and the sandwiching plate bodies are fixed near the center portion in the first direction, while the influence caused by the expansion of the cells is suppressed, the protrusion of the sandwiching plates in the second direction can be prevented.

(8) The battery module according to (7), in which one of the restraining plate bodies and the sandwiching plate bodies has positioning projections (positioning projections 61*c*), the other of the restraining plate bodies and the sandwiching plate bodies has positioning hole portions (positioning hole portion 71*b*) engaging with the positioning projections, the positioning projections and the positioning hole portions are disposed at least one end portion in the first direction, and the lengths of the positioning hole portions in the first direction are longer than those of the positioning projections.

According to (8), the assembly workability between the restraining plate and the sandwiching plate increased by the positioning projections and the positioning hole portions provided in the restraining plate body and the sandwiching plate body increases, and also the generation of excessive stress in the sandwiching plate due to the expansion of the cells can be prevented.

(9) The battery module according to (7) or (8), in which the restraining plate bodies and the sandwiching plate bodies have first fixing portions (first fixing portions 51) near the center portion and second fixing portions (second fixing portions 52) at a position deviated from first fixing portions in the first direction and the third direction and are fixed to each other by fixing members (fixing members 53) in first fixing portions and the second fixing portions, and the sandwiching plate body has a first recess (first recess 71c) and a second recess (second recess 71d) at two different vertices of a virtual quadrangle having a straight line passing through the first fixing portion and the second fixing portion, as a diagonal.

According to (9), when two battery modules are disposed side by side, the interference of the fixing members can be prevented by positioning the fixing members of one battery module in the first recess and the second recess of the sandwiching plates of the other battery module. A pair of sandwiching plates can be configured with one kind of sandwiching plates.

(10) The battery module according to any one of (2) to (9),
the battery module has a plate-like member (lower frame 4) below the sixth surface of the cell stack, the plate-like member includes a plate body (lower frame body portion 41) and a pair of wall portions (guide portions 43) standing from the plate body along the third surface and the fourth surface of the cell stack, the pair of wall portions are disposed between the sandwiching plate body and the third surface of the cell stack and between the sandwiching plate body and the fourth surface of the cell stack, and the restraining plate bodies and the wall portions are not overlapped with each other in the third direction, as viewed in the first direction.

According to (10), the restraining plates are disposed in the gaps formed by the sandwiching plate bodies and the wall portions of the plate-like member, to effectively use spaces. Accordingly, the battery module can be minimized.

(11) The battery module according to (10),
in which the sandwiching plate is fixed to the plate body or the wall portion of the plate-like member.

According to (11), because the sandwiching plate is fixed to the plate body or the wall portion of the plate-like member, the protrusion of the sandwiching plate in the the second direction can be prevented.

(12) The battery module according to any one of (2) to (11),
in which the sandwiching plate body has a plurality of lightening holes (lightening holes 71a), and the plurality of lightening holes are not overlapped with the sandwiching plate elastic portion in the first direction, as viewed in the second direction.

According to (12), by dividing the restraining plate and the sandwiching plate, compared with a case of an integral type, the stiffness required in the sandwiching plate can be reduced, and thus by forming the lightening holes at positions that do not to be overlapped with the sandwiching plate elastic portions in the first direction, the weight of the sandwiching plate can be reduced while the elastic force of the sandwiching plate elastic portion is maintained.

The invention claimed is:

1. A battery module comprising:
a cell stack that is formed by stacking a plurality of cells having positive electrode terminals and negative electrode terminals in a first direction, and includes a first surface that is a surface on one end in the first direction, a second surface that is a surface on the other end in the first direction, a third surface that is a surface on one end in a second direction that is a direction orthogonal to the first direction, a fourth surface that is a surface on the other end in the second direction, a fifth surface that is a surface on one end in a third direction orthogonal to the first direction and the second direction and on which the positive electrode terminals and the negative electrode terminals are disposed, and a sixth surface that is a surface on the other end in the third direction; and
a restraining member that restrains the cell stack, wherein:
the restraining member includes:
a pair of restraining plates that have restraining plate bodies disposed along the third surface and the fourth surface of the cell stack and restrain the cell stack in the first direction; and
a pair of sandwiching plates that have sandwiching plate bodies disposed on the third surface and the fourth surface of the cell stack and sandwich the cell stack in the third direction,
the restraining plate bodies are disposed between the cell stack and the sandwiching plate bodies, and
the restraining plates each have a pair of restraining plate fixing portions that are integrally formed to continue to the restraining plate bodies, and that face in the first direction.

2. The battery module according to claim 1, wherein:
the sandwiching plates include sandwiching plate elastic portions that are formed to be integrated with the sandwiching plate bodies and press the fifth surface of the cell stack toward the sixth surface of the cell stack.

3. The battery module according to claim 2, wherein
the sandwiching plates are fixed to the fifth surface of the cell stack and the sixth surface of the cell stack.

4. The battery module according to claim 3, wherein:
the cell stack has insulating members disposed between adjacent cells or insulating members disposed on the fifth surface of the cell stack;
the insulating members have protruding portions that protrude from the fifth surface in the third direction of the cell stack; and
the sandwiching plate elastic portions engage with the protruding portions.

5. The battery module according to claim 3, further comprising:
end members disposed on both ends of the cell stack, wherein
the sandwiching plate elastic portions engage with the end members.

6. The battery module according to claim 4, wherein:
the sandwiching plate elastic portions have engaging portions; and
the engaging portions of the sandwiching plate elastic portions are movable in the first direction.

7. The battery module according to claim 5, wherein:
the sandwiching plate elastic portions have engaging portions; and
the engaging portions of the sandwiching plate elastic portions are movable in the first direction.

8. The battery module according to claim 2, wherein
the restraining plate bodies and the sandwiching plate bodies are fixed near center portions of the restraining plate bodies in the first direction.

9. The battery module according to claim 8, wherein:
one of the restraining plate bodies and the sandwiching plate bodies has positioning projections;
the other of the restraining plate bodies and the sandwiching plate bodies has positioning hole portions engaging with the positioning projections;
the positioning projections and the positioning hole portions are disposed on at least one end portion in the first direction; and the lengths of the positioning hole portions in the first direction are longer than those of the positioning projections.

10. The battery module according to claim 8, wherein:

the restraining plate bodies and the sandwiching plate bodies have first fixing portions near the center portion and second fixing portions at a position deviated from first fixing portions in the first direction and the third direction and are fixed to each other by fixing members in first fixing portions and the second fixing portions; and the sandwiching plate body has a first recess and a second recess at two different vertices of a virtual quadrangle having a straight line passing through the first fixing portion and the second fixing portion, as a diagonal.

11. The battery module according to claim 2, wherein:

the battery module has a plate-like member below the sixth surface of the cell stack;

the plate-like member includes a plate body and a pair of wall portions standing from the plate body along the third surface and the fourth surface of the cell stack;

the pair of wall portions are disposed between the sandwiching plate body and the third surface of the cell stack and between the sandwiching plate body and the fourth surface of the cell stack; and the restraining plate bodies and the wall portions are not overlapped with each other in the third direction, as viewed in the first direction.

12. The battery module according to claim 11, wherein the sandwiching plate is fixed to the plate body or the wall portion of the plate-like member.

13. The battery module according to claim 2, wherein:

the sandwiching plate body has a plurality of lightening holes, and the plurality of lightening holes are not overlapped with the sandwiching plate elastic portions in the first direction, as viewed in the second direction.

* * * * *